United States Patent
Cardoso et al.

(10) Patent No.: US 11,193,761 B2
(45) Date of Patent: Dec. 7, 2021

(54) SYSTEM AND METHOD FOR X-RAY IMAGING SPHERICAL SAMPLES FOR QUALITY INSPECTION

(71) Applicants: Guilherme Cardoso, San Marcos, CA (US); Griffin Lemaster, Solana Beach, CA (US); Carlos Valenzuela, Chula Vista, CA (US)

(72) Inventors: Guilherme Cardoso, San Marcos, CA (US); Griffin Lemaster, Solana Beach, CA (US); Carlos Valenzuela, Chula Vista, CA (US)

(73) Assignee: Creative Electron, Inc., San Marcos, CA (US)

( * ) Notice: Subject to any disclaimer, the term of this patent is extended or adjusted under 35 U.S.C. 154(b) by 0 days.

(21) Appl. No.: 16/703,640

(22) Filed: Dec. 4, 2019

(65) Prior Publication Data
US 2021/0164778 A1 Jun. 3, 2021

Related U.S. Application Data

(60) Provisional application No. 62/775,364, filed on Dec. 4, 2018.

(51) Int. Cl.
*G01B 15/02* (2006.01)
*G06T 7/60* (2017.01)
*G06T 7/00* (2017.01)

(52) U.S. Cl.
CPC .......... *G01B 15/025* (2013.01); *G06T 7/0004* (2013.01); *G06T 7/60* (2013.01); *G06T 2207/10116* (2013.01)

(58) Field of Classification Search
CPC ....... G01B 15/025; G06T 7/0004; G06T 7/60; G06T 2207/10116
See application file for complete search history.

(56) References Cited

U.S. PATENT DOCUMENTS

| | | | | |
|---|---|---|---|---|
| 4,077,849 A | * | 3/1978 | Ziehm, Jr. | B01D 1/16 202/205 |
| 2014/0378027 A1 | * | 12/2014 | Jackson | A01K 47/00 449/9 |
| 2020/0333133 A1 | * | 10/2020 | Cosneau | G01B 15/025 |

* cited by examiner

*Primary Examiner* — Qian Yang
(74) *Attorney, Agent, or Firm* — Jonathan Kidney

(57) ABSTRACT

An automatic x-ray inspection system and method for inspecting objects, containing a cabinet, a path for an object to roll within the cabinet, from an entry point to an exit point, wherein the path utilizes gravity to alter the position and orientation of the object as it travels along the path, an x-ray imaging system to image the object along the path within the cabinet, wherein the x-ray imaging system has a field of view that captures views of the object along the object's travel, and a computer algorithm to determine a thickness of at least one of a shell and center of the object, wherein if a uniform thickness is determined, the object is tagged as passed or non-passed.

8 Claims, 2 Drawing Sheets

Section View Depicting X-ray Cabinet Configured for Random Ball Rotation

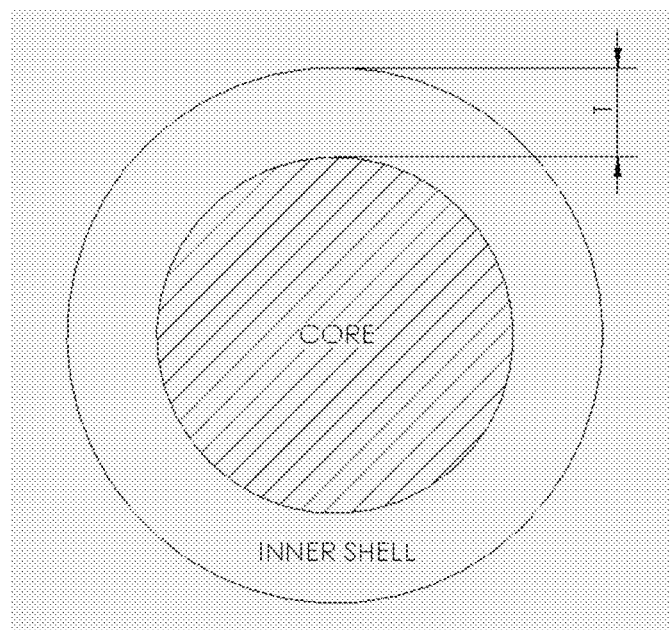
Figure 1: Ball Inner Structure

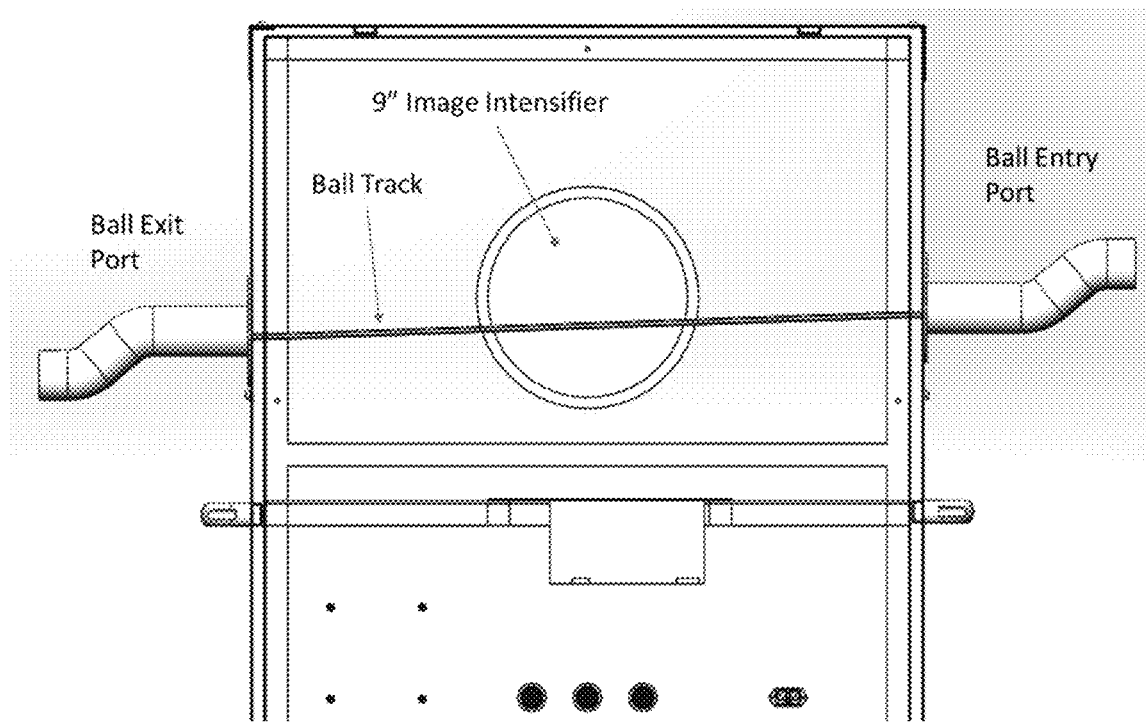
Figure 2: Section View Depicting X-ray Cabinet Configured for Random Ball Rotation

SYSTEM AND METHOD FOR X-RAY IMAGING SPHERICAL SAMPLES FOR QUALITY INSPECTION

CROSS-REFERENCE TO RELATED APPLICATION(S)

This application claims the benefit of U.S. Provisional Patent Application No. 62/775,364, filed Dec. 4, 2018, the contents of which is hereby incorporated by reference in its entirety.

FIELD

This invention relates to systems and methods for automatically inspecting via x-ray analysis, spherical or nearly spherical objects. More particularly, it is directed to determining the internal sphericity of concentrically co-arranged objects using a novel object moving mechanism.

BACKGROUND

There are a large number of spherical objects used in the manufacturing process. Several sporting balls, for example, can be inspected using x-ray images. Among these examples are golf balls, baseballs, basketballs, and others. These samples are manufactured in a variety of ways. In some cases, there is a core of one material, an inner shell of another material, and then the outer shell. It is vitally important that the core is centered in the spherical object. The conventional approach is to utilize a plurality of x-ray sources/emitters around the object to provide the necessary 3-D imaging. Often, this entails moving the sources/emitter and/or the sensors around the object. This approach is somewhat expensive and complicated.

A more simplistic and elegant approach would use the shape of the spherical object and let the object be "naturally" moved in a 3-Dimensional way, avoiding the costly equipment associated with the prior art. The following description details several method(s) and system(s) for achieving the more elegant approach.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its purpose is to present some concepts in a simplified form as a prelude to the more detailed description that is presented later.

In one aspect of the disclosure, an automatic x-ray inspection system for inspecting objects is provided, comprising: a cabinet; a path for an object to roll within the cabinet, from an entry point to an exit point, wherein the path utilizes gravity to alter the position and orientation of the object as it travels along the path; an x-ray imaging system to image the object along the path within the cabinet, wherein the x-ray imaging system has a field of view that captures views of the object along the object's travel; and an computer algorithm to determine a thickness of at least one of a shell and center of the object, wherein if a uniform thickness is determined, the object is tagged as passed.

In another aspect of the disclosure, the above system is provided wherein an wherein if a non-uniform thickness is determined, the object is tagged as not-passed; and/or wherein the entry and exit ports are steel pipes; and/or wherein cabinet is enclosed; and/or wherein the path provides an indeterminate path; and/or wherein if a non-uniform thickness is determined, the object is tagged as passed.

In yet another aspect of the disclosure, a method for x-ray inspecting objects is provided, comprising: rolling an object to roll within an x-ray inspection cabinet, from an entry point to an exit point, wherein the path utilizes gravity to alter the position and orientation of the object as it travels along the path; imaging the object along the path within the cabinet with an x-ray imaging system, wherein the x-ray imaging system has a field of view that captures views of the object along the object's travel; and determine a thickness of at least one of a shell and center of the object, wherein if a uniform thickness is determined, the object is tagged as passed.

In yet another aspect of the disclosure, the above method is provided, wherein if a non-uniform thickness is determined, the object is tagged as not-passed.

BRIEF DESCRIPTION OF THE DRAWINGS

FIG. 1 is an illustration of spherical object with concentric "shells."

FIG. 2 is an illustration of an exemplary cabinet arrangement for spherical object manipulation in an x-ray inspection scenario.

DETAILED DESCRIPTION

It is understood that X-ray inspection can be used to measure the thickness of the inner shell material to ensure it is consistent all around the ball, therefore ensuring the centricity of the core. For example, as shown in FIG. 1, a ball shaped object with an inner core is shown. The outer shell has a thickness of "T". However, an object may appear spherical (core and shell) from one vantage point, but be un-spherical from another angle or vantage point (e.g., oblong). Therefore, the objective of x-ray inspection is to determine uniform concentricity from all the vantage points.

Problem: Millions of sporting balls and other spherical objects are manufactured every day. Currently, x-ray imaging and analysis can be time intensive as the ball must be rotated and imaged in multiple positions to ensure uniform concentricity. The demand for quality inspection cannot currently keep up with the speed of production.

Proposed Solution: An exemplary x-ray cabinet can be configured in such a way that the x-ray source is pointed horizontally (or vertically) at the x-ray detector. The x-ray detector can be high speed and can have a large field of view, if so desired. An x-ray sensor, for example, a 9" diameter Image Intensifier is an analog x-ray detector that works in real time. (Of course, other sizes may be used depending on implementation and design preference.) To this end, the size of the sensor, and the overall configuration of the x-ray machine, will generally depend on the size of the ball or object being inspected. Multiple x-ray source and sensor configurations can be lined up to provide more angles of inspection to the ball as it "rolls" down the track. Additionally, a plurality of tracks can be utilized, for example stacked vertically/horizontally, etc. Cabinet may be fully enclosed or partially enclosed, based on the safety requirements.

In an exemplary embodiment, the balls will enter one side of the x-ray cabinet and roll down a track that allows for random (indeterminate or determinate) rotation along the track. The track will be angled so that gravity will be the primary force acting on the spherical object as it rolls between the x-ray source and x-ray detector. As the objects pass between the source and detector, the x-ray image will show a real time x-ray view of the rotating ball. It is noted here that the track provides the means for "naturally" rotating the ball so that the necessary vantage points or viewing angles are automatically traversed by the ball's rotation. Imaging algorithms will locate the moving ball and measure the thickness of the inner shell of the cores as it passes through the field of view in real time. As rotation is occurring the software monitors the measurement of the inner shell thickness looking for variations. Each object will then be graded as "Pass' or" Fail' based on user defined thresholds. Of course, different thresholds may present different results—for example, multiple grades of Pass may be assigned as well as multiple grades of Fail. The terms Pass and Fail are presented here as the most simple example of grading, understanding other grades or characterizations may be made, according to design preference.

It should be understood this system can be easily modified to apply to the examination of cylindrical objects, based on the orientation of the cylindrical object as it rolls on the path. Conversely, the "lack of sphericity" can be measured for a non-spherical object. An oblong or irregular object can "roll" along the path in a indeterminate matter, and the system's imaging algorithms can be used to determine the non-sphericity.

It should be appreciated that the imaging algorithms can be based on publicly known algorithms, or proprietary algorithms, and such approaches are understood as within the purview of one of ordinary skill in the art. Therefore, the ability to algorithmically determine a shell thickness (e.g., sphericity or concentricness) of objects is not further detailed herein. Implicit in this discussion is the understanding that the x-ray system has a processor or computer that processes the captured x-ray images and applies the imaging algorithms. The processor or computer may be part of the cabinet system or separate, depending on design preference.

A section view of the x-ray cabinet configuration can be seen in FIG. 2. The entry and exit port have a unique design that allow for rapid loading of the spherical objects and radiation shielding. Gravity flow can be used to load them into the x-ray system and feed them out. Additionally, a "door" can be opened and closed for metering the entry of the ball onto the track. The exit and entry ports will be comprised of a pipe (a non-limiting example, steel) that has high enough density to block any radiation scatter from the x-ray cabinet. The track can be one or more paths, rails, guides, a solid (i.e., tube) or partially solid tube (e.g., half circle or semi-circle, etc.). The shape of the ports can be configured to not allow for any radiation to travel directly through thereby reducing any emission level to be within safe operating limits. The track can provide a random rotation or a predetermined rotation, depending on design preference. While FIG. 2 shows a linearly shaped track, the track can have any desired shape or path within the cabinet.

The location and position of the sensor and/or x-ray source can be varied for differently shaped cabinets or objectives. For example, a bottom-top arrangement can be contemplated, so angled, etc. As stated above, multiple tracks can be used, for example for different sized balls.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

What is claimed is:

1. An automatic x-ray inspection system for inspecting objects, comprising:
   a cabinet;
   a path for an object to roll within the cabinet, from an entry point to an exit point, wherein the path utilizes gravity to alter the position and orientation of the object as it travels along the path;
   an x-ray imaging system to image the object along the path within the cabinet, wherein the x-ray imaging system has a field of view that captures views of the object along the object's travel; and
   a computer algorithm to determine a thickness of at least one of a shell and center of the object, wherein if a uniform thickness is determined, the object is tagged as passed.

2. The system of claim 1, wherein if a non-uniform thickness is determined, the object is tagged as not-passed.

3. The system of claim 1, wherein the entry and exit ports are steel pipes.

4. The system of claim 1, wherein cabinet is enclosed.

5. The system of claim 1, wherein path provides an indeterminate path.

6. The system of claim 1, wherein if a non-uniform thickness is determined, the object is tagged as not-passed.

7. A method for x-ray inspecting objects, comprising:
   rolling an object to roll within an x-ray inspection cabinet, from an entry point to an exit point, wherein the path utilizes gravity to alter the position and orientation of the object as it travels along the path;
   imaging the object along the path within the cabinet with an x-ray imaging system, wherein the x-ray imaging system has a field of view that captures views of the object along the object's travel; and
   determine a thickness of at least one of a shell and center of the object, wherein if a uniform thickness is determined, the object is tagged as passed.

8. The method of claim 7, wherein if a non-uniform thickness is determined, the object is tagged as not-passed.

* * * * *